(12) United States Patent
Rege et al.

(10) Patent No.: US 6,532,222 B1
(45) Date of Patent: Mar. 11, 2003

(54) APPARATUS AND METHODS FOR IMPROVING THE ASSIGNMENT OF PARALLEL DEMODULATORS TO MULTIPATHS OF WIRELESS SIGNALS

(75) Inventors: Kiran Meghashyam Rege, Marlboro, NJ (US); Krishna Balachandran, Middletown, NJ (US); Kirk Kuokuang Chang, Morganville, NJ (US); Zhendong Cao, Morganville, NJ (US); Abdulkadir Dinc, Jersey City, NJ (US); Yogendra Champaklal Shah, Morganville, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/186,765

(22) Filed: Nov. 5, 1998

(51) Int. Cl.[7] .............................................. H04B 7/216
(52) U.S. Cl. ...................................... 370/335; 370/318
(58) Field of Search .................................. 370/318, 311, 370/332, 333, 334, 229, 208, 335, 342, 441, 317, 320, 324, 350, 252, 254; 375/222, 220, 130, 134, 137, 149, 242, 356, 362; 455/13.4, 21, 23

(56) References Cited

U.S. PATENT DOCUMENTS

| | | | | |
|---|---|---|---|---|
| 4,303,942 A | * | 12/1981 | Fukuda et al. | 358/147 |
| 5,054,070 A | * | 10/1991 | Eckstein et al. | 381/7 |
| 5,872,810 A | * | 2/1999 | Philips et al. | 375/222 |
| 6,128,276 A | * | 10/2000 | Agee | 370/208 |

* cited by examiner

Primary Examiner—Dang Ton
(74) Attorney, Agent, or Firm—Fish & Neave

(57) ABSTRACT

Demodulator assignment logic is provided that confirms the presence and quality of a multipath before assigning a parallel demodulator to that multipath. Multipath presence and quality are confirmed when at least two power measurements of a multipath at least equal a selectable power threshold. Before permitting demodulated data from an assigned demodulator to be processed, demodulator assignment logic further reconfirms the presence and quality of a multipath via another more reliable power measurement that at least equals another selectable power threshold.

23 Claims, 5 Drawing Sheets

APPARATUS AND METHODS FOR IMPROVING THE ASSIGNMENT OF PARALLEL DEMODULATORS TO MULTIPATHS OF WIRELESS SIGNALS

BACKGROUND OF THE INVENTION

This invention relates to signal demodulation in wireless communication systems. More particularly, this invention relates to apparatus and methods for improving the assignment of parallel demodulators to multipaths of wireless signals.

Wireless communication systems typically include pluralities of stationary transceivers (transmitter/receivers), known as base stations, and pluralities of mobile transceivers, known as mobile stations. Such systems control user access to typically shared communication channel capacity by using multiple access communication protocols. One such protocol is CDMA (code division multiple access).

In CDMA wireless systems, each mobile station communicating with a base station is assigned a unique code. This unique code is used to encode data transmitted from the base station to the mobile station assigned that code. Encoded data is transmitted via a modulated signal, which is a signal that has one or more of its wave characteristics (e.g., frequency, amplitude, or phase) modified to represent the encoded data. Upon receipt of a modulated signal, the encoded data is retrieved from the signal by a process known as signal demodulation. The encoded data is then decoded to extract the transmitted user information.

CDMA is used in both cellular and PCS (personal communications service) mobile communication networks. These types of networks divide geographic areas into cells. Each cell has a base station that communicates with mobile stations in that cell. A PCS network typically has smaller cells and operates at lower power and higher frequencies than common cellular networks. CDMA wireless systems typically adhere to either EIA/TIA IS-95, a digital CDMA standard for U.S. cellular radio systems published by the Electronic Industries Association/Telecommunications Industry Association, or ANSI J-STD-008, a similar standard for PCS networks published by the American National Standards Institute.

As mobile stations move from cell to cell, they are "handed-off" from one base station to another. In CDMA wireless systems, such hand-offs are "soft." A soft handoff is one in which a mobile station first establishes communication with one or more base stations from cells that the mobile station may be entering before terminating communication with the base station from the cell that the mobile station is exiting. A mobile station in soft handoff can therefore be communicating with several base stations simultaneously. Such base stations are known as "active" base stations and are in the "active set" of that mobile station.

Each base station in soft handoff with a mobile station transmits the same information substantially simultaneously to that mobile station. Transmissions from the mobile station are separately received and demodulated by each those base stations. The demodulated transmissions that meet quality criteria are then combined and passed on to a mobile switching center. A mobile switching center switches transmitted data between wireless and wire-based networks (e.g., a public switched telephone network).

CDMA wireless systems are characterized by multipath signal propagation. Multipath signal propagation is a phenomenon that occurs when a base station transmits a signal to a mobile station and the mobile station receives multiple copies of that signal.

These multiple copies are typically created by signal reflection, and travel to the mobile station via different paths through the air. These copies, commonly referred to as multipath components, or simply multipaths, are separated from each other by small time intervals. These time intervals measured from a common reference are commonly known as "phases" of the transmitted signal. Thus a signal spread over several multipaths can be received by a mobile station at several phases, each phase corresponding to a multipath.

A mobile station can receive multipaths of a signal from either a single base station or several base stations. For example, assume a mobile station is in soft handoff with three base stations. If a signal transmitted from each base station results in two multipaths from the first base station, three multipaths from the second base station, and two multipaths from the third base station, the mobile station can receive the transmitted signal via seven multipaths. Multipaths associated with a particular base station can be distinguished from multipaths of other base stations by the spreading sequence (i.e., code) used to modulate the signals transmitted by that base station.

Signals transmitted by base stations in CDMA wireless systems based on the IS-95 or ANSI J-STD-008 standard typically include several communication channels, such as a pilot channel, other overhead channels (e.g., synch and paging channels), and traffic channels. Traffic channels carry information transmitted by users. Each base station in the active set of a mobile station assigns a particular traffic channel to a mobile station. That traffic channel is modulated by a unique "Walsh" code. The pilot channel, on the other hand, is modulated by a Walsh code known by all mobile stations. The pilot channel provides a phase reference that enables mobile stations to perform coherent demodulation of signals transmitted to them over their assigned traffic channel.

Mobile stations in CDMA wireless systems typically include CDMA terminals. A CDMA terminal receives, demodulates, combines, and decodes traffic channel signals received via different multipaths of a wireless signal from one or more active base stations. Note that such traffic channel signals can be combined because the same user information is carried by each multipath.

A CDMA terminal typically includes a "rake" receiver, which has a plurality of parallel demodulators (known as "fingers"). Each demodulator can be independently tuned (i.e., assigned) to a particular phase to demodulate traffic channel signals received at that phase. The CDMA terminal combines the demodulated signals from the assigned demodulators, and then decodes the combined signal to extract the transmitted information, which may be, for example, a voice communication. By combining separately demodulated signals in this manner, each carrying the same user information, the signal-to-noise ratio is enhanced, usually resulting in high quality wireless communication.

However, the exact phases at which multipaths appear at mobile stations are generally not known by the mobile stations. The presence of a multipath at a particular phase can be determined by measuring the power received at that phase. Furthermore, to improve the signal-to-noise ratio, and thus improve communication quality, demodulators should preferably be assigned to phases at which the strongest multipaths appear. Demodulators assigned to weak or non-existent multipaths contribute primarily only noise to the process of combining demodulated traffic channel signals.

The strength of a multipath is indicated by the power level of the pilot channel signal contained within that multipath. CDMA terminals therefore continually measure power at various phases of received pilot signals to first determine whether multipaths are present and then to preferably identify the strongest multipaths.

To conduct initial power measurements, rake receivers typically have a search demodulator, commonly known as a "search finger," in addition to the parallel demodulators used for traffic channel demodulation. The search demodulator typically follows a schedule to measure pilot channel power at various phases within search windows of several base stations. A search window is a period of time encompassing the probable phases at which multipaths from a particular base station may appear. A relatively high value of measured power at a particular phase within the search window of a base station generally indicates the presence of a multipath from that base station at that phase. Demodulator assignment logic within CDMA terminals analyzes the various power measurements to determine the pilot signal phases at which to assign demodulators.

However, these power measurements are statistical and are typically subject to noise and interference from outside sources (e.g., transmissions from other base stations). This noise and interference can result in power measurements that seem to indicate the presence of a multipath at a particular phase when in fact none exists at that phase. This is known as a false alarm.

Moreover, as mobile stations move, the strength of received multipaths can fluctuate because of a phenomenon known as fading, which is caused by signal reflection, refraction, or absorption. Also, as a mobile station moves away from a base station, signals from that base station weaken (received power decreases). Conversely, as a mobile station moves toward a base station, signals from that base station intensify (received power increases). Multipath signal strength can also fluctuate when, for example, a mobile receiver moves through a tunnel or hilly terrain. Therefore, although a single momentary power measurement may indicate the presence of a reasonably strong multipath, that multipath may be weakening and would thus be a poor choice for signal demodulation.

Accordingly, the ability of a CDMA terminal to provide high quality wireless communication is dependent, in large part, on the ability of its demodulator assignment logic to assign demodulators to the strongest received multipaths. However, a disadvantage of known demodulator assignment logic is an inadequate ability to distinguish strong multipaths from false alarms or quickly weakening multipaths. A quickly weakening multipath is one in which initially measured power at least equals a power threshold, but which drops below the threshold within a short period of time. This inadequate ability can result in the erroneous assignment of demodulators to weak or non-existent multipaths. Such erroneous assignments adversely affect communication quality, because, as noted above, those erroneously assigned demodulators contribute primarily only noise to the signal combination process. Furthermore, if a demodulator is assigned to a false alarm or a quickly weakening multipath, a good possibility exists that a stronger multipath is being received by the CDMA terminal—but which is not being used for signal demodulation. This disadvantage of known demodulator assignment logic is amplified in environments where a large number of pilot signals are rapidly fluctuating.

In view of the foregoing, it would be desirable to provide apparatus and methods for improving the assignment of parallel demodulators to multipaths by reducing the likelihood of assigning a demodulator to a false alarm or a quickly weakening multipath.

It would also be desirable to provide apparatus and methods for improving the assignment of parallel demodulators to multipaths by reducing the likelihood of processing demodulated data from a demodulator assigned to a false alarm or a quickly weakening multipath.

SUMMARY OF THE INVENTION

It is an object of this invention to provide apparatus and methods for improving the assignment of parallel demodulators to multipaths by reducing the likelihood of assigning a demodulator to a false alarm or a quickly weakening multipath.

It is also an object of this invention to provide apparatus and methods for improving the assignment of parallel demodulators to multipaths by reducing the likelihood of processing demodulated data from a demodulator assigned to a false alarm or a quickly weakening multipath.

In accordance with this invention, apparatus is provided for assigning parallel demodulators to multipaths of a wireless signal. The apparatus includes at least one parallel demodulator, control circuitry coupled to the demodulator, and memory coupled to the control circuitry. The memory includes a multipath signal database and demodulator assignment logic. The assignment logic creates an unconfirmed entry in the database corresponding to a phase of an active pilot signal (i.e., the pilot signal from an active base station) when power measured at that phase at least equals a first selectable power threshold. The assignment logic deletes an unconfirmed entry from the database when at least one additional power measurement at a phase of an active pilot signal corresponding to the unconfirmed entry is below the first power threshold. The assignment logic confirms an unconfirmed entry when at least one additional power measurement at a phase of an active pilot signal corresponding to the unconfirmed entry at least equals the first power threshold. Only after an entry is confirmed, does the assignment logic assign the at least one demodulator to the corresponding phase of the active pilot signal of that entry.

Apparatus is also provided in which demodulator assignment logic permits processing of demodulated data from a demodulator assigned to a phase of an active pilot signal when power measured at the phase after the demodulator is assigned to that phase at least equals another selectable power threshold. If the measured power is below that threshold, the assignment logic releases the demodulator from that phase.

Furthermore, apparatus is provided that includes selectable first and second parameters for varying the degree to which a multipath's presence and quality are confirmed before assigning a demodulator to the corresponding phase. Apparatus is also provided that includes a live-set database for creating and updating entries corresponding to phases of active pilot signals that have been assigned parallel demodulators.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides apparatus and methods for improving the assignment of parallel demodulators to multipaths of wireless signals. In particular, demodulator assignment logic in accordance with the present invention confirms the presence and quality of a multipath before assigning a parallel demodulator to that multipath. This advantageously reduces the likelihood that a demodulator will be assigned to a false alarm or a quickly weakening multipath. Furthermore, the demodulator assignment logic preferably reconfirms the presence and quality of a multipath before permitting processing of demodulated data from a demodulator assigned to that multipath. This advantageously reduces the likelihood that demodulated data obtained from a false alarm or a quickly weakening multipath, which is of little or no value, will be combined with demodulated data of other multipaths of a wireless signal.

Figure 1:
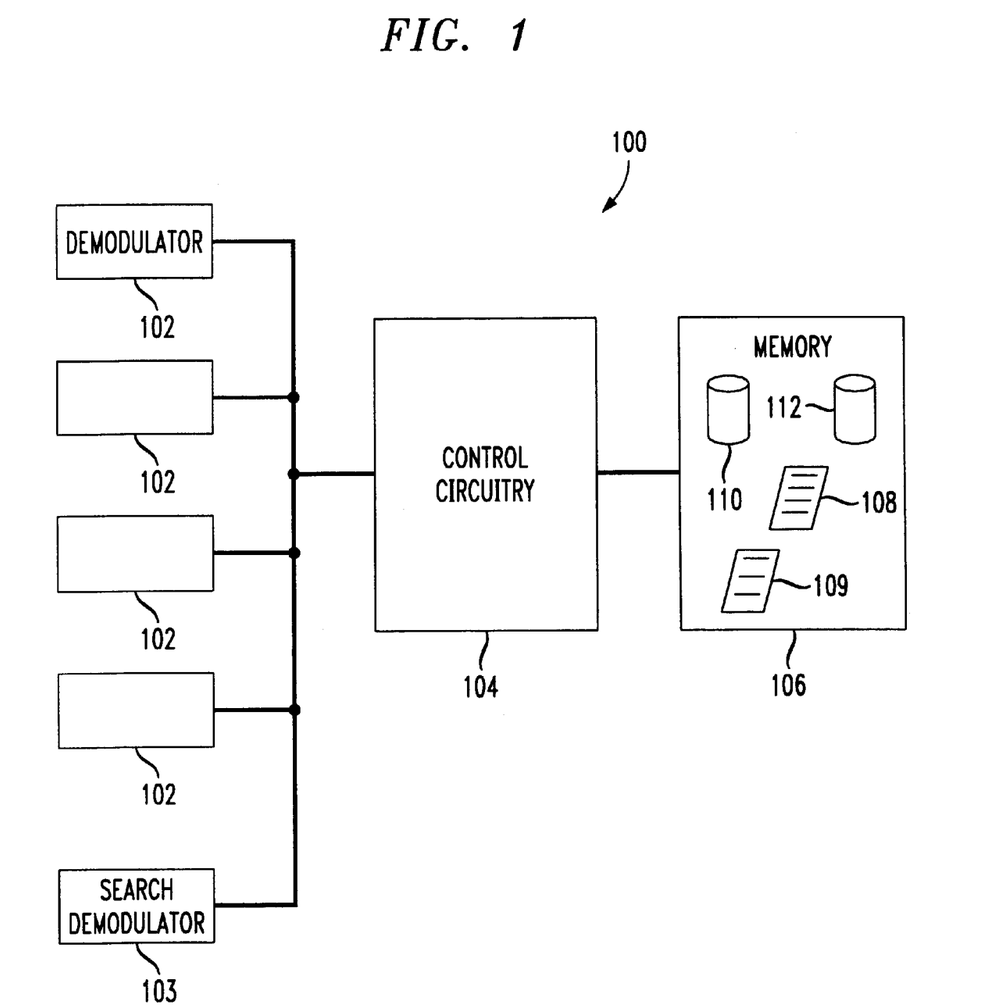
FIG. 1 is a block diagram of a portion of a CDMA terminal according to the present invention.

FIG. 1 shows a portion of CDMA terminal 100 in accordance with the present invention. CDMA terminal 100 can be used in both mobile and base stations in CDMA wireless communication systems. CDMA terminal 100 includes a plurality of parallel demodulators 102 (commonly known as rake fingers), search demodulator 103 (commonly known as a search finger), control circuitry 104, and memory 106. Demodulators 102 are assigned to phases of active pilot signals to demodulate multipaths received at those phases. Demodulators 102 also can produce estimates of power received at those assigned phases. Search demodulator 103 is a demodulator 102 that has been designated to measure power at various phases within search windows of various pilot signals. Note that while only four demodulators 102 and one search demodulator 103 are shown in FIG. 1 for illustrative purposes, other numbers of demodulators 102 and 103 can be coupled to control circuitry 104. Also note that CDMA terminal 100 can preferably designate a demodulator 102 to function as a demodulator 103 and vice versa.

Control circuitry 104 preferably controls the overall operation of CDMA receiver 100. In particular, control circuitry 104 controls demodulators 102 in accordance with demodulator assignment logic 108, which is preferably stored in memory 106. Similarly, control circuitry 104 controls search demodulator 103 in accordance with measurement scheduler 109, which is also preferably stored in memory 106. Demodulated data from demodulators 102 and power measurement data from demodulators 102 and 103 are processed by control circuitry 104. Control circuitry 104 is known and can be implemented in any circuit technology now known (e.g., CMOS or bipolar transistor technology) or later developed, and can be, for example, a microprocessor.

Memory 106 is preferably a non-volatile storage medium capable of storing demodulator assignment logic 108, measurement scheduler 109, various parameters, and preferably two databases, pending-set database 110 and live-set database 112. Memory 106 is preferably an integrated circuit and can include, for example, RAM, EEPROM, EPROM, flash memory, PROM, ROM, any other suitable storage media now known or later developed, or combinations thereof.

Assignment logic 108 includes programming instructions that can be executed by control circuitry 104. A portion of assignment logic 108 performs the following: confirms the presence and quality of multipaths by analyzing power measurements made at various pilot signal phases; creates, updates, and deletes entries from pending-set and live-set databases 110 and 112 corresponding to active pilot signal phases; and assigns demodulators 102 to selected active pilot phases. Another portion of assignment logic 108 reconfirms the presence and quality of multipaths to determine whether demodulated traffic channel data from assigned demodulators 102 should be processed by control circuitry 104.

Measurement scheduler 109 also includes programming instructions that can be executed by control circuitry 104. Scheduler 109 instructs search demodulator 103 to measure power at specified pilot signal phases within search windows of active, neighbor, candidate, and remaining set base stations. Active set base stations are those currently communicating with CDMA terminal 100 (e.g., base stations in soft handoff). Neighbor set base stations are near CDMA terminal 100, but they are not currently communicating with CDMA terminal 100 (i.e., they are not in the active set). CDMA terminal 100 is aware of neighbor set base stations via lists received from active set base stations. Candidate set base stations include those neighbor set base stations whose previous pilot signal power measurements are strong enough to admit the neighbor set base stations into the active set, but which have not yet been admitted. The remaining set includes any other base stations whose pilot signals are scheduled for power measurement.

Power measurements are usually scheduled such that probable phases at which multipaths of an active pilot signal may appear are each sequentially measured before power measurements of other pilot signal phases are made. Power measurements of active set pilots are often interleaved with candidate, neighbor, and remaining set measurements. For example, measurement scheduler 109 may schedule power measurements as follows: phases of active pilot 1, phases of a candidate set pilot, phases of active pilot 2, phases of a neighbor set pilot, phases of active pilot 3, and phases of a remaining set pilot.

Power measurements are typically scheduled at phases that are about one-half "chip" apart in an appropriately centered search window. A chip is a measure of time corresponding to the duration of a signal pulse (i.e., a bit in the spreading sequence used in a CDMA system). A search window is a period of time encompassing probable phases at which multipaths may appear, and is usually a selectable integer multiple of a chip. Typically, a search window is 40–60 chips.

Figure 2:
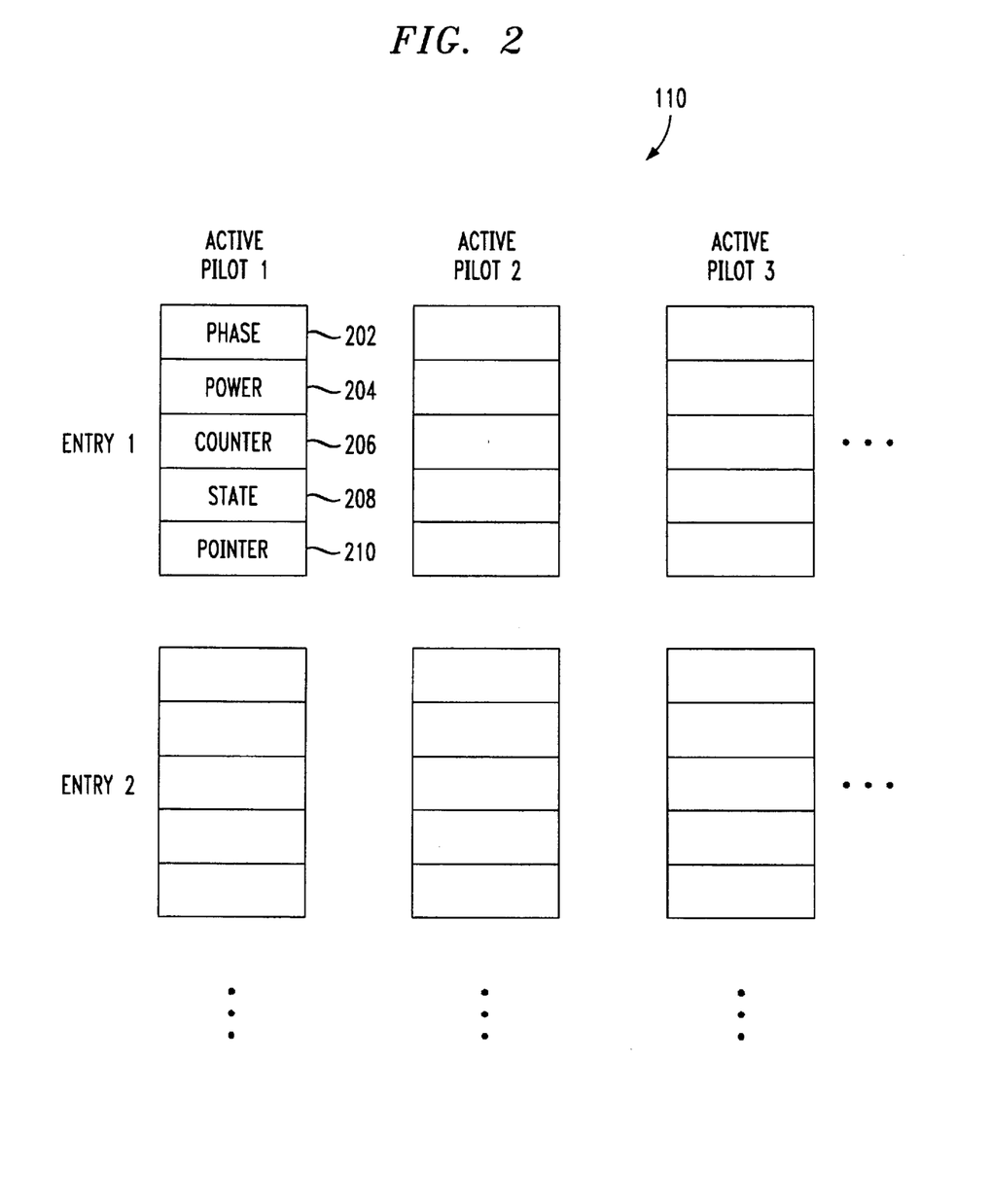
FIG. 2 is a block diagram of a preferred embodiment of a pending-set database according to the present invention.

A preferred embodiment of pending-set database 110 in accordance with the present invention is shown in FIG. 2. Pending-set database 110 includes a plurality of entries that correspond to phases of active pilot signals at which multipaths are believed to be present. Each entry includes a respective data field for phase parameter 202, power parameter 204, counter 206, state parameter 208, and pointer 210. Phase parameter 202 is the phase of the active pilot signal corresponding to that entry. Power parameter 204 is a function of the normalized power measured at that phase. Counter 206 is the number of power measurements for that phase that were below one or more selectable power thresholds. State parameter 208, which is typically not included in known multipath signal databases, is the number of power measurements for that phase that were at least equal to one or more selectable power thresholds. Pointer 210 indicates which, if any, demodulator 102 is assigned to the phase corresponding to that entry. If a demodulator 102 is not assigned to that phase, pointer 210 is null.

Live-set database 112 (not shown) preferably has one entry for each demodulator 102 assigned to an active pilot phase. Thus, for example, if CDMA terminal 100 has four demodulators assigned to active pilot phases, live-set database 112 has four entries. Each live-set entry includes information about the multipath to which the demodulator 102 is assigned, and includes a status field indicating whether the entry is confirmed or unconfirmed. When a live-set entry is confirmed, control circuitry 104 can process the demodulated traffic channel data from the assigned demodulator 102. Each live-set entry has a corresponding pending-set entry and includes a pointer cross-referencing that pending-set entry.

Alternatively, in another preferred embodiment of the present invention, pending-set database 110 and live-set database 112 are combined into a single multipath database (not shown). This combined database has entries that correspond to active pilot phases at which multipaths are believed to be present. Each entry in this database includes data fields for storing the same information stored in the entries of pending-set and live-set databases 110 and 112 except, of course, for pointers cross-referencing live-set database 112 entries with corresponding pending-set database 110 entries.

Pending-set and live-set database entries include the following five types: an unconfirmed pending-set entry, an unassigned confirmed pending-set entry (which is a confirmed pending-set entry whose corresponding active pilot phase has not been assigned a demodulator 102), an assigned confirmed pending-set entry (which is a confirmed pending-set entry whose corresponding active pilot phase has been assigned a demodulator 102), an unconfirmed live-set entry (which corresponds to an assigned confirmed pending-set entry), and a confirmed live-set entry (which also corresponds to an assigned confirmed pending-set entry).

Figure 3A:
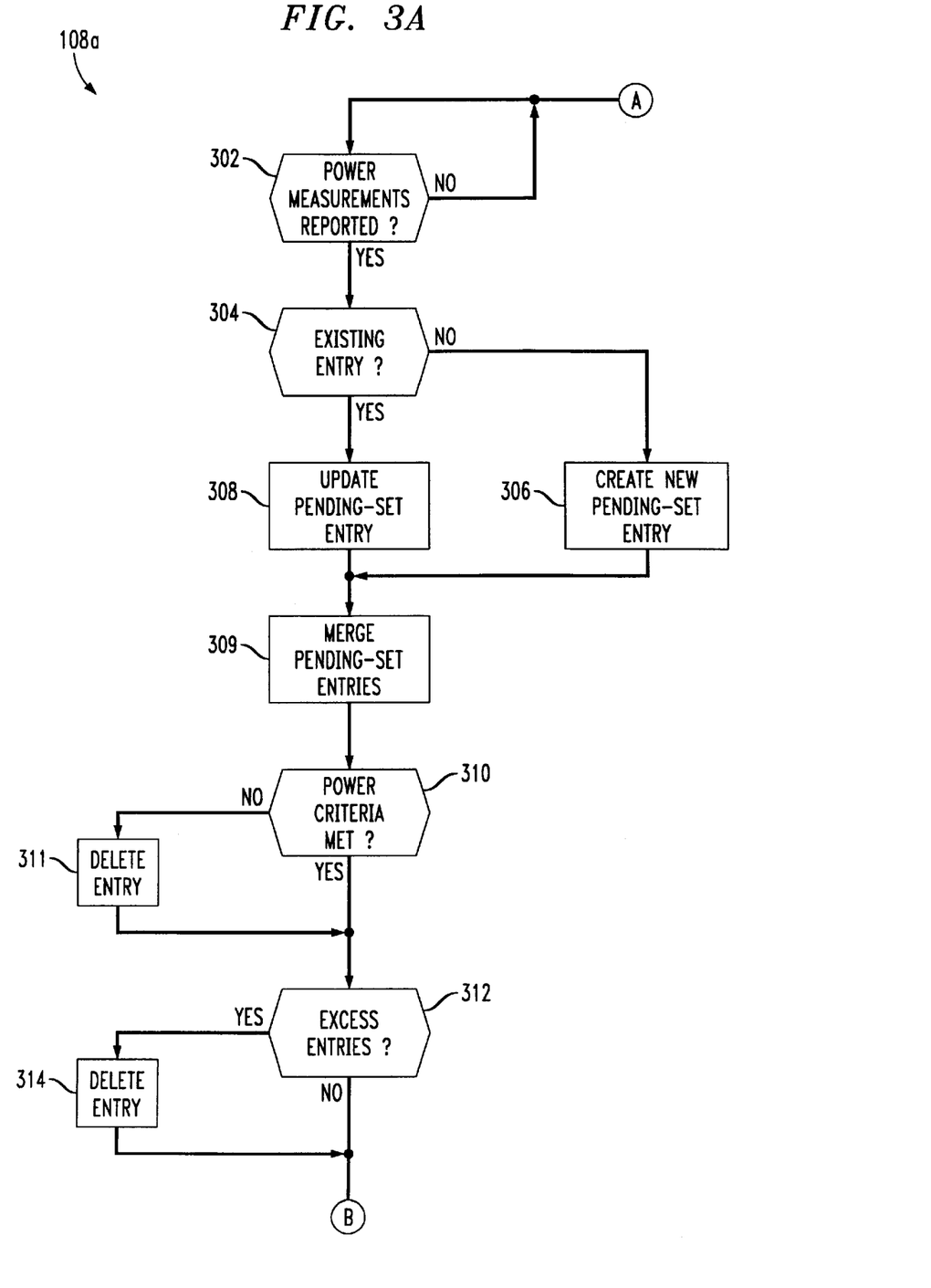
FIGS. 3A–B are flow diagrams of a preferred embodiment of a portion of demodulator assignment logic according to the present invention.
Figure 3B:
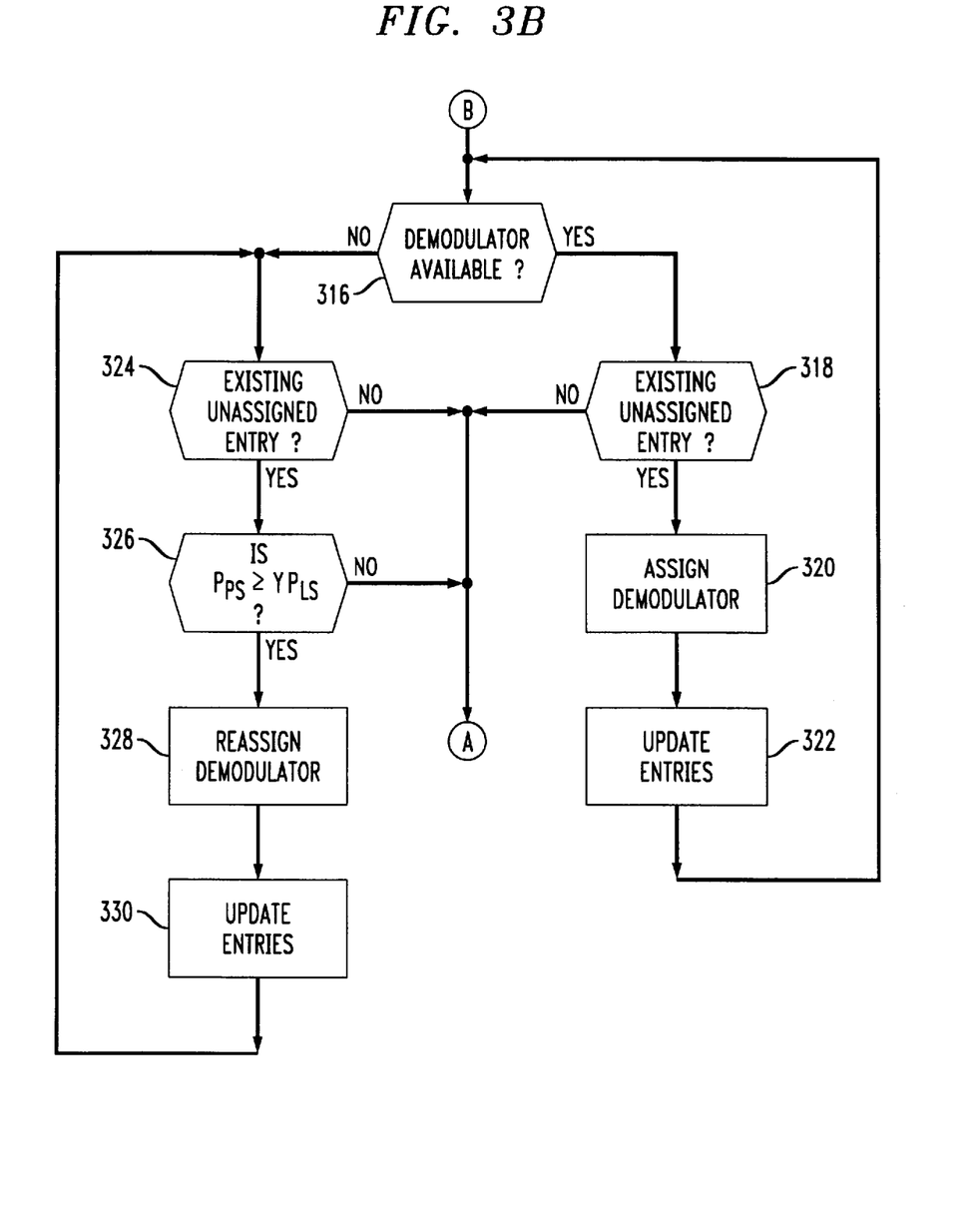

FIGS. 3A–B show a preferred embodiment of a portion of demodulator assignment logic 108 in accordance with the present invention. This portion confirms the presence and quality of a multipath at a phase of an active pilot before assigning a demodulator 102 to that phase. Assignment logic 108a is executed when search demodulator 103 reports power measurements for phases of an active pilot. Assignment logic 108a identifies the strongest multipaths (i.e., those phases measuring the highest power), confirms their presence arid quality by analyzing additional power measurements, and then assigns demodulators 102 to those phases for signal demodulation. By analyzing additional power measurements, false alarms and quickly weakening multipaths are less likely to be assigned a demodulator 102, thus advantageously enhancing the signal-to-noise ratio of combined demodulated multipaths. Such enhanced signal-to-noise ratios usually result in high quality wireless communication.

At step 302, assignment logic 108a waits for power measurements of active pilot phases from search demodulator 103. Search demodulator 103 measures power using a well known multidwell measurement technique. The power measured at each phase is normalized by dividing it by an estimate of the total received power from all base stations (which may include measurement noise). If this normalized power is below a selectable power threshold $P_{MIN1}$, a zero is reported for that measurement. Typically, $P_{MIN1}$ is −18 to −20 dB.

At step 304, assignment logic 108a determines whether non-zero power measurements correspond to phases of existing entries in pending-set database 110. If an active pilot phase at which a non-zero power was measured is within a selectable phase resolution threshold $PH_1$ of an existing entry's phase parameter 202, that non-zero power measurement is assumed to correspond to that entry. Typically, $PH_1$, is about half a chip, but other values can be selected to vary the degree of phase resolution.

If a non-zero power measurement of an active pilot phase does not correspond to an existing pending-set entry, a new unconfirmed pending-set entry for that active pilot is created at step 306. The fields of the new entry are set as follows: phase parameter 202 is set to the phase at which power was measured, power parameter 204 is set to $M/\mu$ (where M is the normalized measured power and $\mu$ is a selectable integer parameter specifying the number of non-zero power measurements required to confirm an unconfirmed pending-set entry), counter 206 is set to zero, state parameter 208 is set to one, and pointer 210 is set to null. Unlike known assignment logic that immediately assigns the next available demodulator 102 to the active pilot phase corresponding to a newly created entry, assignment logic 108a first identifies the newly created entry as unconfirmed, and does not assign a demodulator 102 until at least one additional power measurement confirms the entry. The number of additional power measurements needed to confirm an entry can be selected via parameter $\mu$, which is described in more detail further below. Preferably, more than one additional power measurement is made.

At step 308, existing pending-set entries are updated. If assignment logic 108a determined at step 304 that a non-zero power measurement corresponded to an unconfirmed entry, phase parameter 202 of that entry is replaced with the phase at which the non-zero power was measured. Power parameter 204 (P) is updated as follows:

$$P \leftarrow P+(M/\mu).$$

Counter 206 remains unchanged and state parameter 208 is incremented by one. If state parameter 208 now equals $\mu$, the pending-set entry is confirmed and becomes an unassigned confirmed pending-set entry.

If an existing unconfirmed pending-set entry does not correspond to any non-zero power measurements at step 304, counter 206 of that existing entry is incremented by one, and phase parameter 202, power parameter 204, and state parameter 208 remain unchanged.

For unassigned confirmed pending-set entries that correspond Lo non-zero power measurements at step 304, power parameter 204 (P) is updated as follows:

$$P \leftarrow \alpha P+(1-\alpha)M,$$

where $\alpha$ is a suitable filter constant, typically in the range of 0.5 to 0.95. Phase parameter 202 is replaced with the phase at which the non-zero power was measured. Alternatively, phase parameter 202 can be replaced with some linear combination of the current phase and the phase at which the non-zero power was measured. Counter parameter 206 and state parameter 208 are no longer updated after a pending-set entry is confirmed.

If an unassigned confirmed pending-set entry does not correspond to any non-zero power measurements at step 304, its power parameter 204 is updated as follows:

$$P \leftarrow \beta P,$$

where $\beta$ is also a suitable constant, typically in the range of 0.5 to 0.95. Phase parameter 202 remains unchanged.

Power parameters 204 of assigned confirmed pending-set entries are not updated at step 308. Instead, these power parameters 204 are updated at step 418 of FIG. 4, which is described further below.

At step 309, assignment logic 108a merges duplicate pending-set entries. Two entries are considered duplicates of each other if their phase parameters 202 are within a selectable phase resolution threshold $PH_2$. A typical range of $PH_2$ is from 0.25 to 0.75 chip. Preferably, the duplicate entry with the higher power parameter 204 is retained. If either duplicate entry is confirmed, the merged entry is also confirmed.

At step 310, assignment logic 108a checks whether pending-set entries meet power criteria. Those entries that fail to meet that criteria are deleted at step 311. Unassigned and assigned confirmed pending-set entries are deleted if their power parameter 204 is below a selectable power threshold $P_{MIN2}$. If an assigned confirmed pending-set entry is deleted, its corresponding live-set entry is also deleted. The deletion of a live-set entry releases the corresponding demodulator 102, making it available for reassignment to another active pilot phase. Unconfirmed pending-set entries are deleted if their counter parameter 206 equals a selectable integer parameter $\nu$. Parameter $\nu$ is the number of zero power measurements at which an unconfirmed pending-set entry is deleted.

Parameters $\mu$ and $\nu$ vary the degree to which CDMA terminal 100 filters pending-set entries for false alarms and quickly weakening multipaths. For example, if $\mu=2$ and $\nu=1$, an unconfirmed pending-set entry needs one additional consecutive non-zero power measurement to be confirmed (state parameter 208 was initially set to 1 when the entry was created, thus an additional non-zero power measurement sets state parameter 208 to 2, which then equals $\mu$). The additional non-zero power measurement must be consecutive (i.e., must occur during the next power measurement cycle following the cycle that resulted in the entry's creation) because a single zero power measurement will result in the entry being deleted (counter 206=1=$\nu$).

To confirm an entry when both $\mu$ and $\nu$ equal 2, an unconfirmed pending-set entry needs an additional non-zero power measurement (to set state parameter=2=$\nu$) within the next two consecutive measurement cycles following the cycle that resulted in the entry's creation. If zero power measurements are reported for those next two consecutive cycles, the entry will be deleted (counter 206=2=$\nu$).

In sum, an unconfirmed pending-set entry must be confirmed within ($\mu+\nu-1$) consecutive power measurement cycles (including the cycle that resulted in the entry's creation) or it will be deleted, provided that parameter $\mu$ equals an integer greater than 1. (If parameter $\mu$ equals 1, a newly created pending-set entry is immediately confirmed without any filtering—effectively reducing this portion of assignment logic 108a to known assignment logic.) Thus by varying parameters $\mu$ and $\nu$, the number of non-zero power measurements needed to confirm a pending-set entry, and the number of measurement cycles within which those non-zero measurements must be made, can be selected.

Note that when a pending-set entry is confirmed, its power parameter 204 equals the average value of the normalized power measurements for that entry during the preceding $\mu$ non-zero power measurements. For example, if $\mu$ equals 2, the value of power parameter 204 of the confirmed entry equals the mean of the two normalized power measurements reported for that entry. This averaging provides a very good estimate of the strength of the corresponding multipath by suppressing the effects of fading and noise.

At step 312, the number of excess pending-set entries for each active pilot is determined. If an active pilot has more than a predetermined maximum number of entries, those entries with the lowest power parameters 204 in excess of the maximum number of entries are deleted at step 314. If a deleted pending-set entry has a corresponding live-set entry, that live-set entry is also deleted at step 314, releasing the corresponding demodulator 102 for reassignment to another active pilot phase. By deleting excess entries with the lowest power parameters 204, assignment logic 108a reduces the likelihood that either a false alarm or a quickly weakening multipath will be used in the demodulation process. In addition, by limiting the number of pending-set entries, assignment logic 108a maintains pending-set database 110 at a manageable size.

At step 316, assignment logic 108a checks whether a demodulator 102 is available for assignment to an active pilot phase. If a demodulator 102 is available, assignment logic 108a checks at step 318 whether pending-set database 110 has at least one unassigned confirmed pending-set entry. If none exists, assignment logic 108a returns to step 302.

If at least one unassigned confirmed pending-set entry exists, assignment logic 108a assigns at step 320 an available demodulator 102 to the active pilot phase corresponding to that unassigned confirmed pending-set entry. That entry now becomes an assigned confirmed pending-set entry. If two or more unassigned confirmed pending-set entries exist, the available demodulator 102 is assigned to the active pilot phase corresponding to the entry having the highest power parameter 204 (i.e., the strongest multipath).

At step 322, assignment logic 108a updates pointer 210 of the newly assigned confirmed pending-set entry to indicate the assigned demodulator 102. Furthermore, a corresponding unconfirmed live-set entry is created in live-set database 112. Assignment logic 108a then returns to step 316.

If a demodulator 102 is not available at step 316, assignment logic 108a checks for unassigned confirmed pending-set entries at step 324. If none exists, assignment logic 108a returns to step 302.

If at least one unassigned confirmed pending-set entry exists, assignment logic 108a determines at step 326 whether the unassigned confirmed pending-set entry (or if more than one unassigned confirmed pending-set entry exists, the unassigned confirmed pending-set entry with the highest power parameter 204) has a power parameter 204 at least $\gamma$ times greater than the power parameter 204 of the weakest live-set entry (i.e., the live-set entry with the lowest power parameter 204), where $\gamma$ is a selectable parameter. If the pending-set entry's power parameter 204 is not at least $\gamma$ times greater than the weakest live-set entry's power parameter 204, assignment logic 108a returns to step 302.

If the pending-set entry's power parameter 204 is at least $\gamma$ times greater than the weakest live-set entry's power parameter 204, assignment logic 108a, at step 328, releases the demodulator 102 that was assigned to the active pilot phase corresponding to the weakest live-set entry, and reassigns that demodulator 102 to the active pilot phase corresponding to the pending-set entry.

At step 330, the following changes are made to pending-set and live-set databases 110 and 112: the live-set entry corresponding to the active pilot phase from which the demodulator 102 was released is deleted, pointer 210 of the corresponding assigned confirmed pending-set entry is set to null to indicate the release of the demodulator 102 (thus changing this entry to an unassigned confirmed pending-set entry), pointer 210 of the unassigned confirmed pending-set entry is updated to indicate the reassigned demodulator 102 (thus changing this entry to an assigned confirmed pending-set entry), and a new unconfirmed live-set entry is created. Assignment logic 108a then returns to step 324 to check whether additional unassigned pending-set entries exist.

Figure 4:
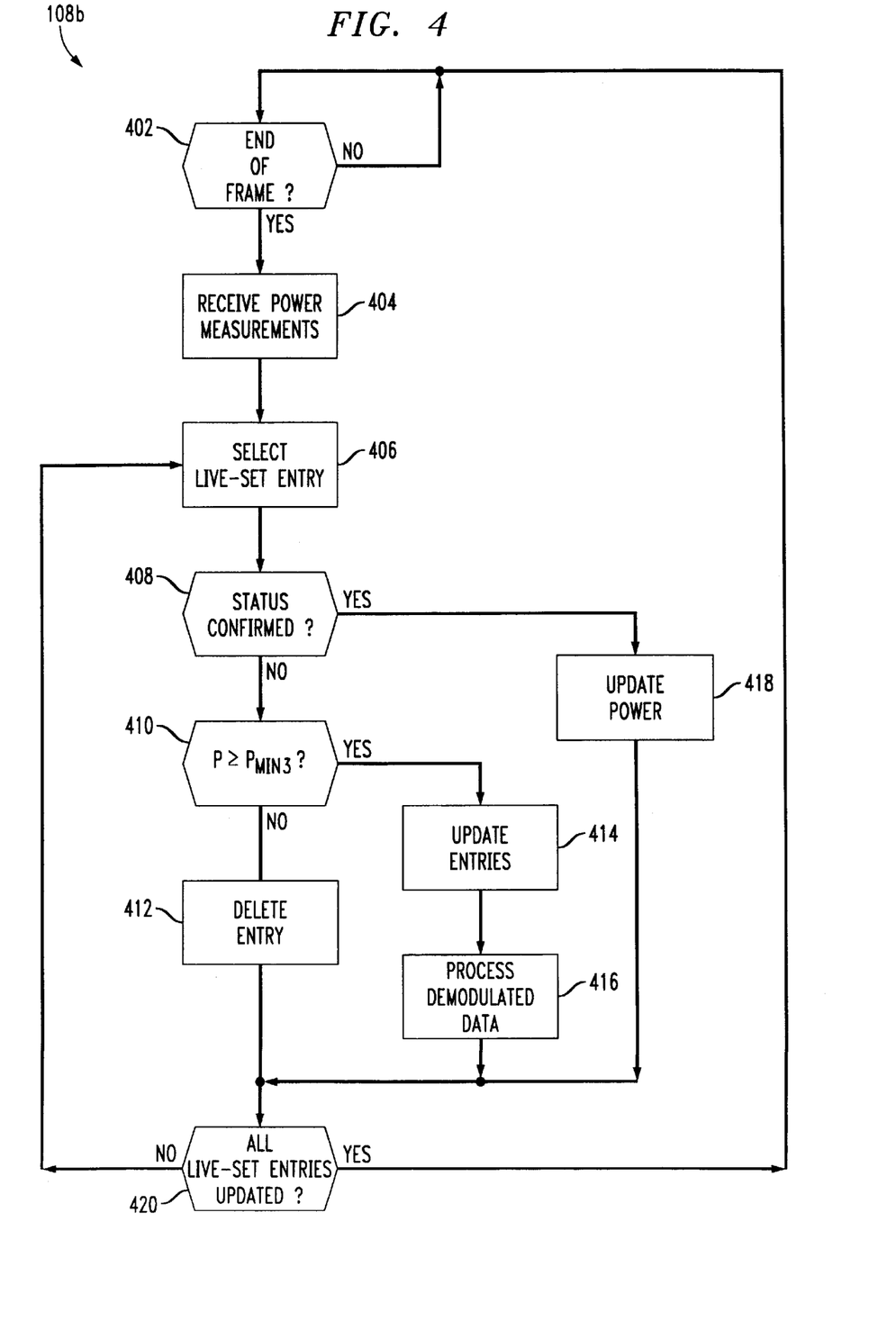
FIG. 4 is a flow diagram of a preferred embodiment of another portion of demodulator assignment logic according to the present invention.

FIG. 4 shows a preferred embodiment of another portion of assignment logic 108 in accordance with the present invention. This portion reconfirms the presence and quality of a multipath at a phase of an active pilot before permitting control circuitry 104 to process demodulated data from a demodulator 102 assigned to that phase. Assignment logic 108b reconfirms the presence and quality of multipaths by analyzing power measurements from assigned demodulators 102.

Assignment logic 108b executes once each frame and independently of assignment logic 108a (step 402). A frame is a fixed interval of time, typically 20 msec in CDMA systems adhering to the IS-95 standard. At the end of each frame, assignment logic 108b receives power measurements from demodulators 102 for each of the live-set entries (step 404). At step 406, a live-set entry is selected for analysis.

At step 408, the status of the selected live-set entry is checked. If the status is unconfirmed, the power reported for that entry by the corresponding demodulator 102 is compared with power threshold $P_{MIN3}$ at step 410. If this power is below $P_{MIN3}$, at step 412 the entry is deleted from live-set database 112 and its corresponding pending-set entry is deleted from pending-set database 110. Accordingly, the corresponding demodulator 102 is released for reassignment by assignment logic 108a to another active pilot phase corresponding to an unassigned confirmed pending-set entry.

If at step 410 the power reported by the corresponding demodulator 102 at least equals $P_{MIN3}$, assignment logic 108b, at step 414, marks the status field of that live-set entry confirmed and sets power parameter 204 of the corresponding pending-set entry equal to the power reported by the corresponding demodulator 102. At step 416, assignment logic 108b signals control circuitry 104 to start processing demodulated data from the corresponding demodulator 102.

If at step 408 the selected live-set entry is a confirmed entry, power parameter 204 (P) of the corresponding assigned confirmed pending-set entry is updated at step 418 as follows:

$$P \leftarrow \alpha_{LIVE}P + (1-\beta_{LIVE})M,$$

where M is the normalized power reported by the corresponding demodulator 102 and $\alpha_{LIVE}$ is a suitable filter constant, typically in the range of 0.5 to 0.95.

At step 420, assignment logic 108b checks whether all live-set entries have been updated with the mostly recently received power measurements. If not, assignment logic 108b returns to step 406 to process another live-set entry. If all live-set entries have been updated, assignment logic 108b returns to step 402 to await the end of the current frame.

Note that more reliable power measurements are received at step 404 than those reported at step 302, because demodulators 102 are typically assigned to pilot signal phases for longer durations than search demodulator 103. Search demodulator 103 is assigned to pilot signal phases usually only long enough to make a single power measurement. Such single, momentary power measurements are more likely to include false alarms or quickly weakening multipaths. In contrast, demodulators 102 measure power each frame at assigned phases for as long as they are assigned to those phases. Thus, these continual power measurements are more likely to indicate the presence and strength of actual multipaths.

In sum, assignment logic 108 significantly reduces the likelihood that a demodulator 102 will be assigned to a false alarm or a quickly weakening multipath by advantageously confirming the presence and quality of a multipath via at least two initial power measurements at its corresponding phase. In the unlikely event that a demodulator 102 is assigned to a false alarm or a quickly weakening multipath signal, assignment logic 108 reduces the likelihood that demodulated data from that demodulator 102 will be processed by advantageously reconfirming the presence and quality of a multipath via another more reliable power measurement. Furthermore, assignment logic 108 continually performs power comparisons to ensure that demodulators 102 are assigned to the strongest multipaths. Assignment logic 108 also advantageously provides CDMA terminal 100 with variable degrees of multipath confirmation via selectable parameters $\mu$ and $v$, and variable levels of acceptable multipath signal strength via selectable parameter $\gamma$ and selectable power thresholds $P_{MIN1}$, $P_{MIN2}$, and $P_{MIN3}$.

Thus it is seen that apparatus and methods are provided for improving the assignment of parallel demodulators to multipaths of wireless signals. One skilled in the art will appreciate that the present invention can be practiced by other than the described embodiments, which are presented for purposes of illustration and not of limitation, and the present invention is limited only by the claims which follow.

What is claimed is:

1. Apparatus for assigning a parallel demodulator to a multipath of a wireless signal, said apparatus comprising:
   at least one parallel demodulator;
   control circuitry coupled to said demodulator; and
   memory coupled to said control circuitry, said memory comprising:
      a database, and
      demodulator assignment logic; wherein said assignment logic:
      creates an entry in said database corresponding to a phase of an active pilot when power measured at said phase at least equals a first selectable threshold;
      deletes said entry from said database when at least one additional power measurement at said phase is below said first threshold;
      confirms said entry when at least one additional power measurement at said phase at least equals said first threshold; and
      assigns said demodulator to said phase when said entry is confirmed.

2. The apparatus of claim 1 wherein said confirmed entry includes a power parameter, said power parameter being a function of power measurements made at said phase, said assignment logic further deleting said confirmed entry when said power parameter is below a second selectable threshold.

3. The apparatus of claim 1 wherein said assignment logic further permits processing of demodulated data from said demodulator assigned to said phase when power measured at said phase after said demodulator is assigned to said phase at least equals a third selectable threshold.

4. The apparatus of claim 1 wherein said assignment logic further releases said demodulator assigned to said phase when power measured at said phase after said demodulator is assigned to said phase is below a third selectable threshold.

5. The apparatus of claim 1 wherein said assignment logic further deletes said confirmed entry from said database when power measured at said phase is below a third selectable threshold.

6. The apparatus of claim 1 wherein said entry includes a state parameter, said state parameter indicating a number of power measurements made at said phase that at least equal said first threshold.

7. The apparatus of claim 6 wherein said assignment logic confirms said entry when said state parameter equals a first selectable parameter.

8. The apparatus of claim 1 wherein said entry includes a counter, said counter indicating a number of power measurements made at said phase that are below said first threshold.

9. The apparatus of claim 8 wherein said assignment logic deletes said entry from said database when said counter equals a second selectable parameter.

10. The apparatus of claim 1 wherein said memory further comprises a second database, and said assignment logic further:
creates a second entry in said second database corresponding to said confirmed entry, said phase corresponding to said confirmed entry also corresponding to said second entry; and
deletes said second entry from said second database when power measured at said phase is below a third selectable threshold.

11. The apparatus of claim 10 wherein said assignment logic further deletes said confirmed entry when said second entry is deleted.

12. The apparatus of claim 10 wherein said assignment logic further confirms said second entry when power measured at said phase at least equals said third threshold.

13. The apparatus of claim 10 wherein said assignment logic further permits processing of demodulated data from said demodulator assigned to said phase when said second entry is confirmed.

14. Apparatus for assigning parallel demodulators to multipaths of a wireless signal, said apparatus comprising:
a plurality of parallel demodulators;
control circuitry coupled to said demodulators; and
memory coupled to said control circuitry, said memory comprising:
demodulator assignment logic,
a pending-set database, and
a live-set database; wherein said assignment logic:
creates an unconfirmed pending-set entry in said pending-set database corresponding to a phase of an active pilot when power measured at said phase at least equals a first selectable threshold;
deletes said unconfirmed pending-set entry from said pending-set database when at least one additional power measurement at said phase is below said first threshold;
confirms said unconfirmed pending-set entry when at least one additional power measurement at said phase at least equals said first threshold;
assigns one of said demodulators to said phase;
creates an unconfirmed live-set entry in said live-set database corresponding to said confirmed pending-set entry when one of said demodulators is assigned to said phase, said phase also corresponding to said unconfirmed live-set entry;
deletes said unconfirmed live-set entry from said live-set database when power measured at said phase is below a third selectable threshold;
releases said assigned demodulator from said phase when said unconfirmed live-set entry is deleted;
confirms said unconfirmed live-set entry when power measured at said phase at least equals said third threshold; and
permits processing of demodulated data from said assigned demodulator when said corresponding unconfirmed live-set entry is confirmed.

15. A method of assigning a parallel demodulator to a multipath of a wireless signal, said method comprising:
creating an entry in a database corresponding to a phase of an active pilot when power measured at said phase at least equals a first selectable threshold;
deleting said entry from said database when at least one additional power measurement at said phase is below said first threshold;
confirming said entry when at least one additional power measurement at said phase at least equals said first threshold; and
assigning a parallel demodulator to said phase when said entry is confirmed.

16. The method of claim 15 wherein said confirming comprises:
incrementing a state parameter each time power measured at said phase at least equals said first threshold; and
confirming said entry when said state parameter equals a first selectable parameter.

17. The method of claim 15 wherein said deleting comprises:
incrementing a counter each time power measured at said phase is below said first threshold; and
deleting said entry from said database when said counter equals a second selectable parameter.

18. The method of claim 15 further comprising deleting said confirmed entry when a power parameter is below a second selectable threshold.

19. The method of claim 15 further comprising releasing a demodulator assigned to said phase when power measured at said phase after said demodulator is assigned to said phase is below a third selectable threshold.

20. The method of claim 16 further comprising permitting processing of demodulated data from said demodulator assigned to said phase when power measured at said phase after said demodulator is assigned to said phase at least equals a third selectable threshold.

21. The method of claim 15 further comprising:
creating a second entry in a second database that corresponds to said confirmed entry, said phase corresponding to said confirmed entry also corresponding to said second entry;
confirming said second entry when power measured at said phase at least equals a third selectable threshold; and
deleting said second entry when power measured at said phase is below said third threshold.

22. The method of claim 21 further comprising permitting processing of demodulated data from said demodulator assigned to said phase when said second entry is confirmed.

23. The method of claim 21 further comprising releasing said demodulator assigned to said phase when said second entry is deleted.

* * * * *